(12) United States Patent
Icke et al.

(10) Patent No.: US 9,061,282 B2
(45) Date of Patent: Jun. 23, 2015

(54) REACTION PLATE

(75) Inventors: Richard Geoffrey Icke, West Midlands (GB); Brian George Bryden, Coventry (GB)

(73) Assignee: LGC Genomics Limited (GB)

( * ) Notice: Subject to any disclaimer, the term of this patent is extended or adjusted under 35 U.S.C. 154(b) by 35 days.

(21) Appl. No.: 13/111,649

(22) Filed: May 19, 2011

(65) Prior Publication Data

US 2012/0138221 A1 Jun. 7, 2012

Related U.S. Application Data

(63) Continuation of application No. 10/432,186, filed as application No. PCT/GB01/05100 on Nov. 18, 2001, now abandoned.

(30) Foreign Application Priority Data

Nov. 20, 2000 (GB) .................................. 0028275.6

(51) Int. Cl.
*B01L 99/00* (2010.01)
*B01L 3/00* (2006.01)
(Continued)

(52) U.S. Cl.
CPC ......... *B01L 3/50851* (2013.01); *B01J 19/0093* (2013.01); *B01J 2219/00833* (2013.01); *B01L 3/50853* (2013.01); *B01L 7/52* (2013.01); *B01L 2200/12* (2013.01); *B01L 2300/044* (2013.01); *B01L 2300/0829* (2013.01); *B29C 65/1616* (2013.01); *B29C 65/1635* (2013.01); *B29C 65/1674* (2013.01); *B29C 66/112* (2013.01);
(Continued)

(58) Field of Classification Search
CPC ............ B29C 65/1635; B29C 65/1638; B29C 65/1654
USPC ............... 422/547, 551, 552, 553; 156/272.2, 156/272.8, 273.3, 273.5
See application file for complete search history.

(56) References Cited

U.S. PATENT DOCUMENTS 3,997,385 A 12/1976 Osborne
4,542,833 A 9/1985 DeVaughn
(Continued)

FOREIGN PATENT DOCUMENTS

AU 1513002 A 5/2002
DE 42 25 679 A1 2/1994
(Continued)

OTHER PUBLICATIONS

SK Science Kit® website page dated May 5, 2011 (1 page) http://sciencekit.com/reaction-plates/p/IG0024814/.
(Continued)

*Primary Examiner* — Jill Warden
*Assistant Examiner* — Dwayne K Handy
(74) *Attorney, Agent, or Firm* — Geoffrey M. Karny

(57) ABSTRACT

A reaction plate includes a welded plastics planar laminate consisting of an aperture plate and a film, the aperture plate having at least one planar surface and a plurality of apertures in the planar surface of the apertured plate and the film being attached to the planar surface of the apertured plate around the or each aperture by welding. The welding is preferably laser or transmission welding. A method of forming such reaction plates using diode laser welding. An apparatus for handling such reaction plates including performing polymerase chain reactions (PCRs) or primer extensions therewith.

21 Claims, 5 Drawing Sheets

(51) Int. Cl.
   B01J 19/00 (2006.01)
   B01L 7/00 (2006.01)
   B29C 65/00 (2006.01)
   B32B 27/00 (2006.01)
   B29C 65/16 (2006.01)
   B29L 31/00 (2006.01)

(52) U.S. Cl.
   CPC ......... B29C 66/114 (2013.01); B29C 66/53461 (2013.01); B29C 66/53462 (2013.01); B29C 66/81267 (2013.01); B29L 2031/737 (2013.01); B32B 27/00 (2013.01); B29C 65/1638 (2013.01); B29C 65/1667 (2013.01)

(56) References Cited

U.S. PATENT DOCUMENTS

| | | | |
|---|---|---|---|
| 5,763,263 | A | 6/1998 | Dehlinger |
| 5,858,309 | A * | 1/1999 | Mathus et al. ............. 422/553 |
| 5,885,470 | A | 3/1999 | Parce et al. |
| 5,985,214 | A * | 11/1999 | Stylli et al. ............. 422/65 |
| 6,037,168 | A | 3/2000 | Brown |
| 6,171,780 | B1 | 1/2001 | Pham et al. |
| 2002/0054833 | A1 * | 5/2002 | Qu et al. ............. 422/102 |
| 2004/0067171 | A1 | 4/2004 | Icke et al. |

FOREIGN PATENT DOCUMENTS

| | | |
|---|---|---|
| EP | 0212656 | 3/1987 |
| EP | 0347579 | 12/1989 |
| EP | 0483569 | 5/1992 |
| EP | 1337336 A2 | 8/2003 |
| GB | 2369086 A | 5/2002 |
| WO | 9412405 | 6/1994 |
| WO | 9829736 | 7/1998 |
| WO | WO 99/42608 | 8/1999 |
| WO | 9943432 | 9/1999 |
| WO | 9956954 | 11/1999 |
| WO | 0064747 | 11/2000 |
| WO | WO 02/28532 A2 | 4/2002 |
| WO | 0240158 A2 | 5/2002 |

OTHER PUBLICATIONS

MicroAmp® Optical 384—Well Reaction Plate with Barcode Invitrogen website page dated May 5, 2011 (1 page) http://products/invitrogen.com/ivgn/product/4309849.

Fisher Scientific Chemplates Reaction Plate website page dated May 5, 2011 (1 page) http://www.fishersci.com/ecomm/servlet/fsproductdetail?....

gel company website page dated May 5, 2011 (1 page) http://www.gelcompany.com/products/genomics/dna-amplification ....

Hitachi: Applied Biosystems 3730/3730x1 DNA Analyzers Sequencing Chemistry Guide (3 pages).

* cited by examiner

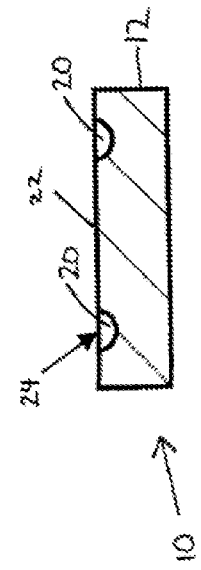
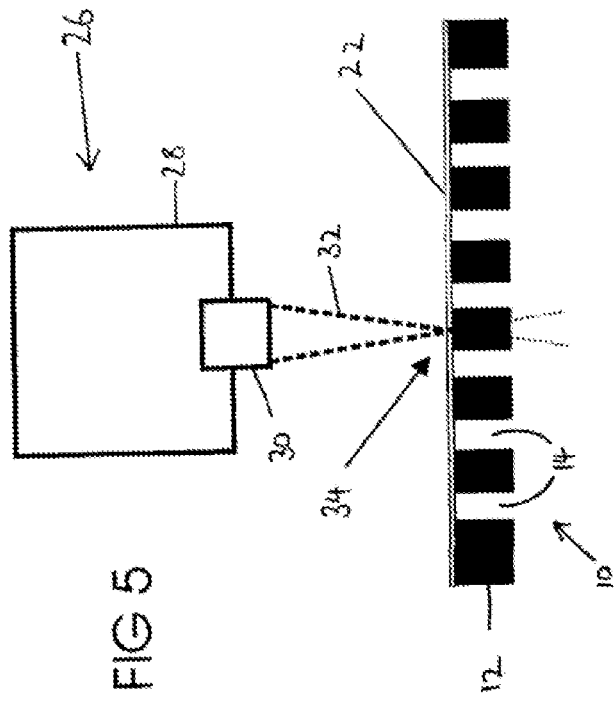
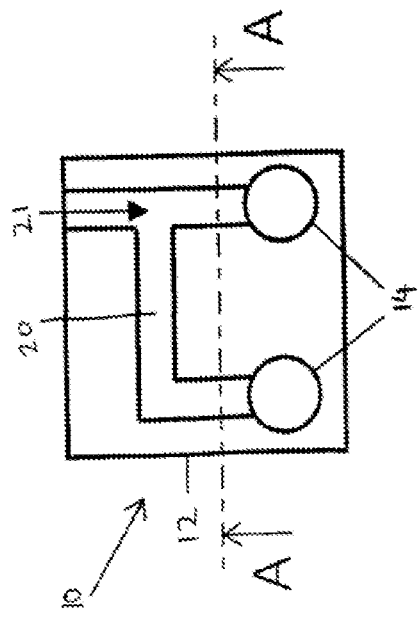
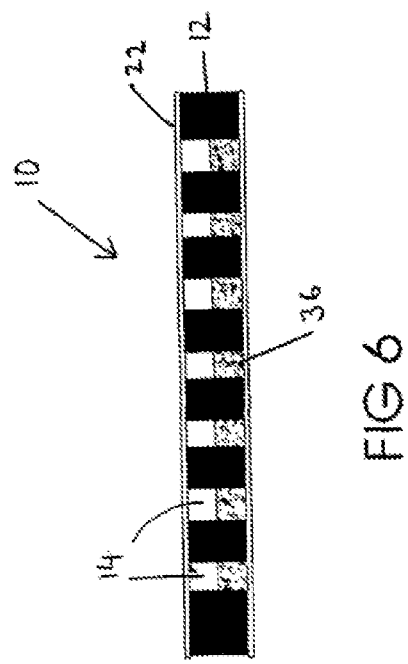

REACTION PLATE

RELATED APPLICATIONS

This application is a continuation of U.S. patent application Ser. No. 10/432,186 filed on Oct. 20, 2003, which was entered into the U.S. as a 35 U.S.C. §371 national stage filing of International Application No. PCT/GB2001 /05100 filed on Nov. 18, 2001.

The present invention relates to a reaction plate, a method of manufacture thereof, and an automated reaction plate processing apparatus.

There are many circumstances in which multiple batch reactions need to be performed, such as Genotyping applications, for example TaqMan™ applications (Applied Biosystems). DNA amplifications by means of polymerase chain reaction (PCR) or primer extension is a method routinely used in genotyping, such as SNP (single nucleotide polymorphism) analysis. SNP specific targets are observed via a reaction plate from either its top or bottom (after a PCR amplification, primer extension or hybridisation step) or a sample or reagent is removed and interpreted via spectroscopy, mass spectroscopy, sequencing or hybridisation. These batch reactions can be performed on the reaction plates. These reaction plates, in many such applications, are often referred to as microtitre plates. These reaction plates have been generally supplied as injection moulded, one piece reaction plates having multiple wells formed therein in the form of miniature test tubes.

The polymerase chain reaction (PCR) technology is a major research tool throughout molecular biology, both academically and in the pharmaceutical industry. The limitations of use of such reactions have historically been the high costs resulting from the cost of reagents (particularly the enzyme) and the relatively high volumes of reagent needed to be used in the injection moulded microtitre plates; typical well volumes in prior art devices could be as large as 200 microlitres. However, it could be possible to obtain effective results from plates that have well volumes as small as two microlitres and lower. To date, however, effective reaction plates of well volume down to this size have not been readily achieved.

Another problem with the relatively large volume in the prior art devices is that the excess air gap in the wells of such reaction plates causes evaporation and condensation problems that can reduce the efficiency of the reactions. Sometimes, mineral oil will be used on top of the reaction to prevent/stop evaporation/condensation problems (oil capping). However this may give rise to problems of getting rid of the oil after the reaction has gone to completion. It would be therefore be desirable to minimise the size of the excessive air gap in the multi-well reaction plates to minimise evaporation or to avoid the need for oil capping.

One and two piece injection moulded reaction plates have been used in the prior art with smaller well sizes, some having up to 1536 wells. These have been made of polystyrene. However, a problem with these reaction plates is that for successful PCR the reaction plate has to be mechanically stable; polystyrene becomes warped and distorted at the high temperatures usually required for PCR (approx. 94° C. or 95° C.). Another problem is that the base of the prior art is complex (Genetix 1536 polypropylene "V" shaped plate). This makes it difficult to mate the base to a thermal transfer plate. Therefore, each well will not transfer externally applied heat into the wells of the reaction plate efficiently, thereby making heat dependant reactions less reliable. There may be variations in the heat transferred to the various wells in the reaction plate. It would therefore be desirable to provide a reaction plate that allows heat easily to be transferred into the well and which transfer is uniform. Use of injection moulding would appear not to allow thin enough bases to be reliably formed for such transfer to occur.

Multi-well reaction plates should have a high density of wells. In conventional prior art reaction plates, arrays of, for example, 8 by 12 wells and 16 by 24 wells have been provided. This limits each reaction plate to 96 and 384 reactions at a time, respectively. It would be desirable therefore to increase the number of wells at a much reduced reagent volume to allow an increased reaction turnover at reduced costs.

A further problem with prior multi-well reaction plates is that external chemicals in the form of glue, solvent adhesive or the like are generally used together with pressure, to attach a cover sheet to the wells to close the wells, for example to reduce reagent/sample loss due to evaporation. Glues, such as solvent adhesives, can also cause erroneous reaction within the well.

The prior art also teaches thermal welding a sheet onto a reaction plate for sealing the wells. The heat causes melting of the thermal glue as well as the plastic (typically polypropylene) of the microtitre plate, thus creating a thermally welded seal. However, current thermal welding techniques are not well suited to the sealing of the very high-density, low volume microtitre plates that are useful in implementing the present invention due to the heat from the heat source dissipating into the sample reagents.

A new form of reaction plate, especially one that is free of any bonding agent that could ffect the reaction, would therefore be desirable to meet FDA compliant protocols.

A further use for such reaction plates is in genotyping. Genotyping is a vast, commercial industry. Most genotyping methods require a DNA amplification process. This is also where the majority of process costs occur. By reliably and routinely working with low volumes of reagent and with high throughtputs, the cost per reaction could be substantially reduced. However, prior art devices have not achieved this reliably. For this reason, costs of approximately 0.5 US dollars per reaction are frequently incurred. However, this figure could be reduced to 0.1 US dollars per reaction by reducing the well or reaction volume of 10 microlitres to a volume of one or two microlitres per reaction. The present invention allows this to be achieved. To put this achievement into perspective, the required scale of genotyping in just a single pharmaceutical company can easily run to 100 million reaction per year, thus costing approx. $50,000,000. By reducing the volume size to just two microlitres, this cost could potentially be reduced to $10,000,000. (linkage and association studies).

The well known TaqMan™ (Applied Biosystems) biotyping systems, is a government approved systems for GMO (Genetic Modified Organisms) and military NBC warfare testing in the USA, as well as most large SNP clinical diagnostic markers. The existing TaqMan 7700™ system uses 8 by 12 (96) well reaction plate technology. Each well is at least approximately 200 microlitres in volume. By using the reaction plates of the present invention, this could be reduced to 2 microlitres, and less. The current TaqMan 7700™ 96 well plate will not work at these lower sample/reagent volumes due to the high internal volume problems. The present invention could also provide perhaps a 16 fold increase in throughput due to an increased number of wells per reaction plate at an affordable cost. Current 7700™ technology would be incapable of the required pharmaceutical high throughput genotyping due to high equipment cost and high reagent costs.

The current developments in SNP maps (in connection with, for example, Alzheimer's, cancer, heart disease etc) is creating a market for the mass detection of specific disorders. This could involve specific, quantified SNP maps being carried out on large groups or populations or individuals, at the hospital intake or GP level. These SNP maps could look at single disorders on large populations or more at the individual level with a large numbers of SNP targets being tested for. Only by increasing throughput and reducing costs could such extensive testing be undertaken. It would be desirable to achieve $10^6$ sample tests in a day.

As has been the case in the electronics and computer industries, trends in analytical, chemical and biochemical and biochemical instrumentation have been towards miniaturisation, In chemical and biochemical analyses, such miniaturisation, as achieved in, for example, 1536 high density microtitre plates, provides numerous advantages. These include significantly smaller reagent requirement, faster throughput, readily automatable processes, and in many cases improved results/data.

By way of example U.S. Pat. Nos. 5,498,392 and 5,587,128 describe the performance of amplification reactions in microfabricated devices including micro-scale flow systems and/or reaction chambers. Such systems substantially reduce the requirements for expensive reagents utilised in amplification reactions.

Despite the numerous advantages realisable with these two US patents, the advantages are often difficult to attain due to problems with user handling and system interfaces.

It would therefore be desirable to miniaturise a number of reactions into the common microtitre plate footprint with very low reaction volumes. In particular it is desirable to miniaturise the amplification process in PCRs, and to increase the highest density microtitre plate format possible from the current 384 well microtitre plate.

It is preferable and typical for a PCR suitable reaction plate to be composed of polypropylene. Further, for miniaturisation of the reaction volume, for example in a 1536 well plate, the sealing of the wells in the plate should be extremely good. This is to avoid any cross contamination between wells and to stop any reagents from escaping whilst in the process of PCR. A water tight seal is also desirable to minimise the evaporation of the reaction volume at the high temperatures involved.

It should be noted that despite these incentives, no suitable reaction plate device, until now, had been devised. The possibilities of high well density and low well volume reaction plates by means of the present invention enable the genotyping field to be substantially expanded, using the robust and approved chemical testing techniques already established throughout the scientific community.

The present invention addresses the short comings of the current state of the art enabling the use of 1536 (and potentially higher density) well plate technology for any reaction that requires a well sealing or closing step. This invention is of particular importance in the miniaturisation of the Polymerase Chain Reaction and its use in Genotyping applications.

The present invention provides a method of forming a seal around a reaction plate well comprising the step of attaching a plastics film to the plate over the well using a transmission welder to form the seal.

According to another aspect of the present invention there is provided a reaction plate comprising a welded plastics planar laminate consisting of an apertured plate and a film, the apertured plate having at least one planar surface and a plurality of apertures in the planar surface of the apertured plate and the film being attached to the planar surface of the apertured plate around the or each aperture by welding.

Preferably, each aperture, together with the film, defines a container.

Preferably the film covers all the apertures, most preferably extending over the entire planar surface of the apertured plate.

Preferably the reaction plate comprises the welded plastics planar laminate when the plate is in its unused state.

Although the apertures may extend only part way through the apertured plate, preferably the or each aperture extends from a first planar surface of the apertured plate to a second, opposed planar surface. A second film may be welded to the second surface, for example to seal or close the container(s) formed by the aperture(s) and the first film.

Preferably the plurality of apertures are arranged in an array. Preferably the centre to centre spacing of the apertures is 2.25 mm.

Channels or grooves, in particular surface grooves or micro lanes, may be provided in the apertured plates so that this invention can be used to seal one or more micro-channel, series of channels or reservoirs by welding a film to a flat planar surface containing said structures, preferably by laser welding. Such channels or grooves will allow fluid communication between adjacent apertures, for example. It should be noted that laser welding simplifies the creation and sealing of micro lanes compared to micro machining and photolithography.

Preferably the reaction plate's other side is flat. However, the reaction plate may take the form of an array of mini test-tubes, as provided in the prior art (see, for example, FIG. 7). Preferably such test-tubes would each be of the same size and length.

Preferably the welding is achieved by transmission welding, for example laser welding. For laser welding, a laser capable of localised heating of the plate surface to a temperature to melt the plastics material of the plate and the film can be used.

The laser should be of such power, and controlled with sufficient accuracy, such that it should not damage any reactants or samples that might have been deposited in the reaction wells. Most preferably the welding is diode laser welding.

The welding may comprise hot glue welding (e.g. a thermally activated bond) in which a glue is melted, for example with a laser so that it becomes tacky for attaching the film to the plate.

These and other forms of transmission welding allow smaller apertures to be closed than with conventional thermal welding techniques since the heat is accurately focused on the apertured surface and is not absorbed in the reagent/sample. The smaller containers or wells achievable with these accurate welding processes can allow a reduction of the well volumes, compared to the prior art devices. This allows the volume of fluid to be in a greater proportion relative to the containment volume of the well without being a vastly excessive volume of reagent, i.e. wasteful of expensive reagents and compounds such as would be required in the prior art devices for achieving the same effect; a large air gap allows excessive evaporation of the reagent, which is undesirable.

Preferably, for a liquid volume of 2 microlitres, the aperture containment volume is only 4 microlitres. Prior art devices perhaps used a 3 microlitres sample to a 100 microlitres containment volume. Further, lowering the volumes of reagent has the advantage of saving costs. Yet further it enables the number of apertures in a given size of reaction plate to be increased, which allows an increased throughput of tests at low reagent volumes to be fully realised. This also increases the number of tests achievable when only a limited original sample, for example of DNA or RNA, is available to work with.

Preferably the reaction plate is formed only of chemically stable materials, for example polymers such as polypropylene or polycarbonate. Polypropylene is particularly suitable since it is injection mouldable, inert with respect to reagents, heat stable at reaction temperatures, for example from 0° to 95° C., and good at conducting heat so that heat can be transferred into the aperture therethrough. It is also available optically clear which is useful for fluorescent analysis of the reagent sample post-detection.

Another advantage is that polypropylene can be welded, and after welding it has minimal cross talk from adjacent reaction wells due to the sealing effect of the weld around each reaction well. The prior art only achieves a clear base by joining thereon a clear thicker base either at the injection mould stage, or later, which is not welded and which can allow cross talk.

Yet further, polypropylene is capable of high thermal flux and can be supplied in films of a desireable thickness, for example between 1 and 500 micrometers, preferably between 10 and 120 micrometers and most preferably approximately 2 micrometers. It also can be frozen for storage purposes, e.g. taken down to temperatures of −20° C. and −70° C.

Polymer crosslinking can also be achieved in the weld, e.g. by melting the facing surfaces of both the plate and the film so that they fuse together, especially if the two joined components are formed of the same plastics material, although dissimilar materials can also be welded. Crosslinking provides a very efficient weld strength. It may be sufficient, however, simply to melt a glue layer between the film and the plate with the welder so that the glue welds (bonds) the film and the plate together. The glue layer may have been applied either to the film or to the plate, but preferably to the film.

Preferably the apertured plate is of a solid section, other than the apertures. However, if formed of an array of mini test tubes, for example mounted within a frame, the tubes should be interconnected by a webbing to form the apertured plate. At least one side of the apertured plate must have a planar surface, however, to receive the film; in use, the reaction plate will generally be heated on a hot-plate having a planar surface by means of which heat can be transferred, through the film, to a sample contained in the containers or wells defined by the apertures. To achieve this, the reaction plate may first need to be inverted so that the sample rests against the film due to gravity, and the film is then rested on the hot-plate.

Heat for processing can alternatively be transferred to the apertured plate by total immersion into water baths to achieve the desired reaction. For this, reaction plates will generally be held in a suitable holder.

Preferably the film is formed of a transparent plastics material. The film is preferably optically clear with very low distortion or cross talk. This allows both manual (i.e. human) and automated (i.e. machine) inspection of, for example, each PCR. However, for sensors operating using UV or IR sensation, for example, i.e. outside the visible range, the film need only be transparent for the appropriate EM wavelength used. Using laser welding to attach the film also increases (improves) the fluorescent imaging signal to noise ratio due to the better optical parameters achieved with the thereby attached film compared to thermal welding due to simplified optical properties of the planner reaction plate.

The film is preferably a laminate. For example, it may have a polyester top, a polypropylene centre and a heat meltable glue bottom for attachment to the plate.

Preferably the apertured plate is substantially rigid and opaque, and made of a plastics material.

Preferably the apertured plate is of a suitable infrared (IR) absorbent material (e.g. black) to facilitate transmission welding.

The apertured plate may be made of a non suitable infrared (IR) absorbent material, with the film material being suitably infrared absorbent to facilitate transmission welding. This allows the welding of the film to the plate to be performed by the laser through the planar apertured plate.

The apertured plate may be made of a non suitable infrared (IR) absorbent material that inhibits transmission welding, but it can be coated with absorbent dye to facilitate transmission welding. The dye may be an ink, applied, for example with a marker, or the like, to define the locations at which welding is required.

Preferably the apertured plate is black. This is to prevent cross interference in automated inspection apparatus from, for example, PCRs in adjacent wells. The apertured plate could be otherwise light absorbent to the relevant frequency of the EM radiation used by the automated inspection equipment. The absorbency also prevents internal reflections within the aperture, e.g. from side walls thereof, from interfering with automated inspection.

In use, one or more reagent and one or more sample (multiplexed) will be retained within the or each aperture by the film or films. Preferably, the film is readily piercable to allow the reagent and sample, for example in fluid form, to be removed from within the aperture, if required.

Preferably the weld around the aperture is continuous to seal the film to the apertured plate around the periphery of the orifice at the end thereof. However, when channels or grooves are provided, the weld would then preferably be continuous along the periphery of the channels or grooves and the apertures connected thereby.

Preferably the apertured plate is less than 4 mm thick. For example, the apertured plate may be approximately 0.2 mm thick, approximately 0.5 mm thick, approximately 1.3 mm thick, approximately 2 mm thick or approximately 3 mm thick. Such thin apertured plates may be formed or cut from continuous webs, for example off a roll of apertured material. This could give advantageous handling characteristics in an automated manufacturing and processing apparatus and higher throughputs could be achieved.

The apertures may have a circular cross-section and a length corresponding to the thickness of the apertured plate (i.e. extending perpendicularly to the surfaces thereof) Preferably the apertures have a diameter of 1.8 mm. Each aperture thereby has an internal volume of approximately 3.36 microlitres when 1.32 mm long. FIG. 8 shows such a construction.

Each aperture can be substantially frustoconical, i.e. having a diameter of 1.8 mm on one planar surface (e.g. the top) and 0.2 mm on the opposite surface (e.g. the base). Alternatively, the apertures may have a square cross-section. One example, having apertures that are 1.8 mm square, defines apertures each having an internal volume of 4.27 microlitres when 1.32 mm long.

The apertures may be conical, e.g. V bottomed, extending not all the way through the plate, as shown in FIG. 9.

Preferably the plate is 3 mm thick, having 2.5 mm deep wells, which may, for example, be conical, frustoconical, square or tubular, each well having a 0.5 mm thick bottom wall. The plate is preferably injection molded having 2.25 mm centre to centre aperture spacings. The wells are 1.8 mm wide.

The length of the apertures, i.e. usually the thickness of the apertured plate, can be used to vary the volume of the apertures, as can the diameter of the apertures. A desirable aperture volume would be 4 microlitres or less.

According to a second aspect of the present invention, there is provided a method of forming a reaction plate in accordance with the preferred aspect of the present invention comprising providing an apertured plate and a film and welding the film to the apertured plate for form the welded plastics planar laminate.

There is also provided a method of closing an aperture of a reaction plate comprising transmission welding a film onto an apertured plate having a flat planar surface and at least one aperture extending from the flat planar surface towards the reaction plate's other side, the film closing the aperture at the flat planar surface end thereof.

Preferably, the reaction plate comprises any of the features defined above.

For apertures extending all the way through the apertured plate, the film may close either end thereof. Preferably, a first film closes the first end and a second film closes the second end. Preferably both films are transmission welded to the aperture plate.

Preferably the welding is transmission diode laser welding.

A two sided reaction plate that has been transmission sealed on a first surface (a single transmission sealed reaction plate) may be sealed on the second surface with a suitable PCR compatible tape which is clamped onto a planar surface of the plate during temperature processing.

Preferably, the aperture is at least partially filled with a quantity of one or more reagent and sample, the film or films sealing the aperture closed with the reagent and sample thereby contained with the aperture. The thereby sealed aperture containing the reagent and/or sample can be used for mass sample/reagent storage (i.e. for compound libraries, population DNA samples or mass SNP probes).

Preferably the partially filled aperture plates of reagents/DNA samples/SNP probes can be stored in a dried or wet state to be later accessed and reconstituted for distribution or use.

Laser welding (using near infrared, ND YAG or diode) of the film(s) to the apertured plate allows minimal amounts of energy/heat to be passed into the reagent sample mix, for example fluid/compound sample, during the transmission welding step. This is unlike what would be achieved with conventional thermal welding; melting a glue backed foil to affix it to a planar surface requires a thermal insulating air gap between the film and the reagent sample mix. Using conventional thermal welding, the welded surface, which includes the cover of the aperture, generally becomes hot-to-touch post-welding. This is disadvantageous. The second aspect of the present invention therefore simplifies the welding process and decreases the possibility of any unintentional premature degradation of reagents or sample caused by the welding process, or the residual heat therefrom, since it localises the heating.

The present further provides a method of forming a seal around a microtitre or reaction plate well comprising the step of laser welding a plastics film over the well to form the seal. The laser welding can cause the film to be fused around the well or, with thermal glue between the film and the plate, bonded around the well. The film is preferably coated with such a glue on its plate facing side.

In accordance with this and other aspects of the present invention, preferably the whole plate is welded shut using laser welding and the plastic film.

The film may be coated with an affinity reagent, which is preferably streptavidin.

Preferably the film is coated with a chemical used in a reaction for which the microtitre plate is to be used. The walls of the wells can be similarly coated.

The present invention further provides an automated reaction plate processing apparatus for automated processing of a reaction plate, the apparatus incorporating means to carry out the or each method described above.

The apparatus may simply be for applying a film to an apertured plate. The apertured plate may already have a first film applied thereto and reagents and/or samples in the apertures. However, the apparatus may be for welding a first film to an apertured plate.

The apparatus may comprise means for filling the or each aperture at least partially with a reagent and sample, such as filling means known in the prior art, e.g. robotic syringe injectors, piezo electric dispensers, pin dispensing, peristaltic pumps, positive displacement dispensers or capillary dispensers.

The apparatus may comprise means for holding the or each aperture plate at the time of welding, e.g. using a vacuum bed, to allow accurate transmission welding.

Preferably, the apparatus fills apertures of an apertured plate having a first film welded thereto with sample and/or reagent. Preferably, the apparatus then seals the apertures closed by welding a second film to an opposite, planar surface of the reaction plate to the surface to which the first film is welded.

Preferably, the apparatus comprises one or more diode laser welding unit(s) for welding the film(s) to the apertured plate.

The apparatus may also comprise an injection moulding unit for forming apertured plates. Alternatively, the apertured plates may be provided as blanks. The or each aperture may then be formed in or through the blanks by the apparatus, e.g. by drilling, laser cutting, etching or milling. Preferably, however, the apertured plates are supplied to the apparatus ready for having the film or films welded thereto. These apertured plates may be as cast or moulded for example.

The films may be unrolled from a roll of film material or be pre cut to size.

Preferably the or each film is made of polypropylene, and may be thermal glue backed polypropylene.

The apparatus may also comprise means to carry out reactions using the reaction plates e.g. reaction plate handlers and heating means for applying heat to the reagent and sample within the apertures through conduction and/or radiation through the film. The handlers may need to rotate the reaction plates to position the appropriate side thereof (with the film) against the heating means. Suitable reaction plate handlers and heating means are already known in the prior art, for example robotic handlers, hot-plates and water baths.

The apparatus may also comprise sensing means to inspect the contents of the apertures during or after the reaction has been effected, such as means using fluorescence, reflectance or the like. The sensing means can view within the apertures, at the PCR for example, through the film.

The application of the current state of the art technology to a miniaturised 1536 (or higher) well, sub 1 microlitre (or lower) reaction volume is unsuitable due to a combination of well design and sample intolerance. To create an optimal volume to air gap ratio the miniaturised plate requires a shallow profile, as shown in FIG. 10b. This is contrary to the current PCR suited plate technology (shown in FIG. 10a). Use of this lower plate profile causes the use of conventional thermal sealing techniques to be unsuitable due to the proximity of the sample to the heating element, which would result in the sample "boiling off". This would lead to bad seals and reaction failures from the sample evaporation or sample damage Use of laser welding avoids this problem since the heating effect is precisely localised.

The present invention will now be described by way of example with reference to the accompanying drawings, in which:

FIG. 3 is a plan view of a variant aperture formation in accordance with the present invention;

FIG. 4 is section A-A from FIG. 3.

FIG. 5 is a schematic view of a diode laser welding a film onto an apertured plate in accordance with the present invention;

FIG. 6 is a schematic section of a filled and sealed reaction plate of the present invention;

Figure 2:
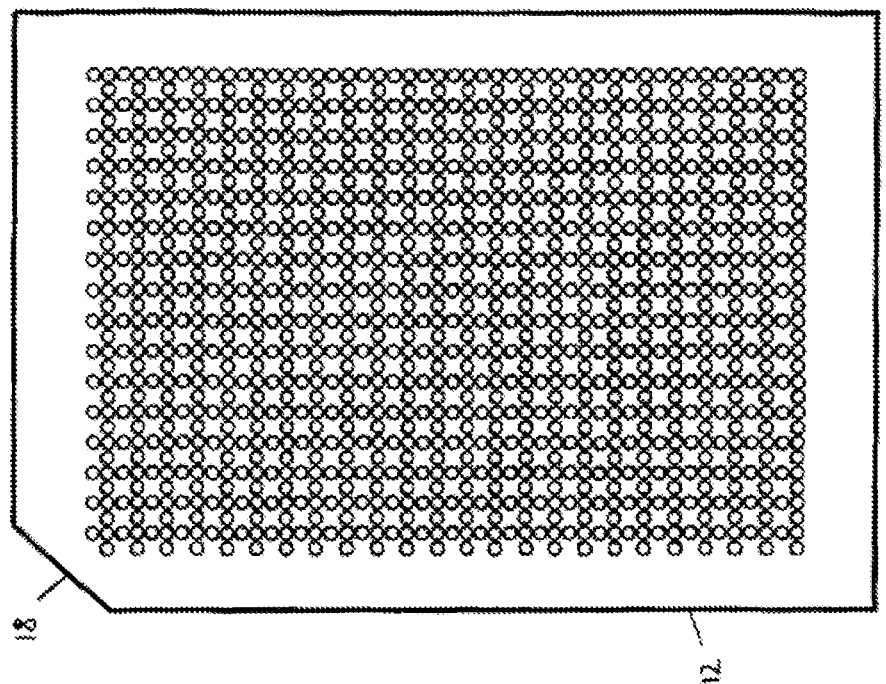
FIGS. 1 and 2 are plan views of two reaction plates in accordance with the present invention.
Figure 1:
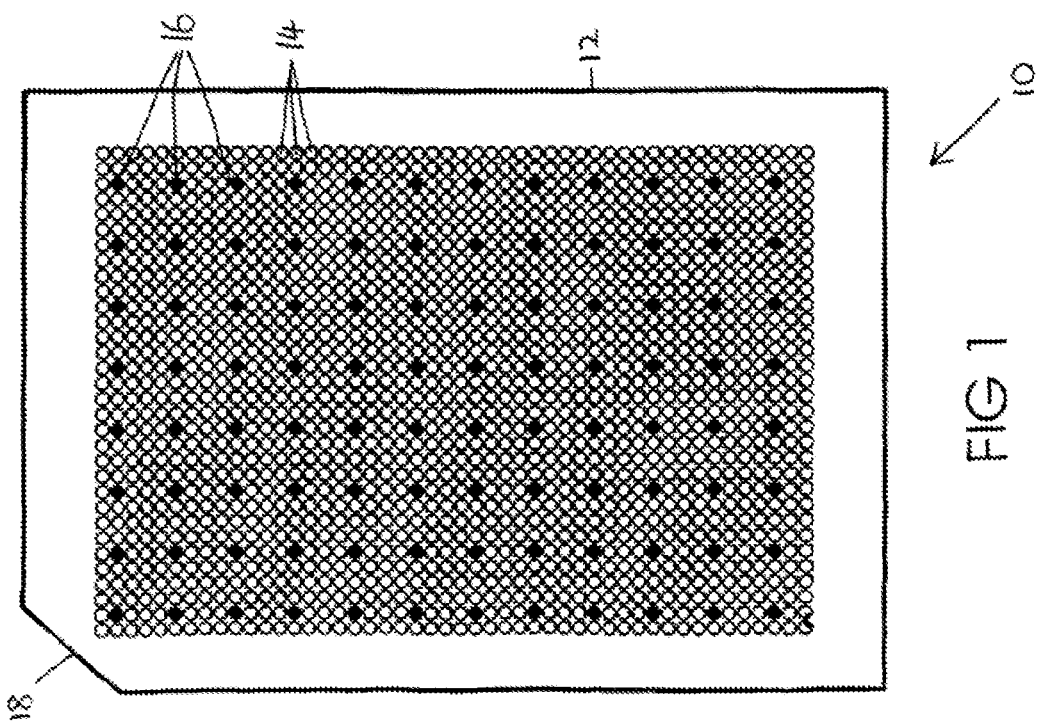
Figure 7:
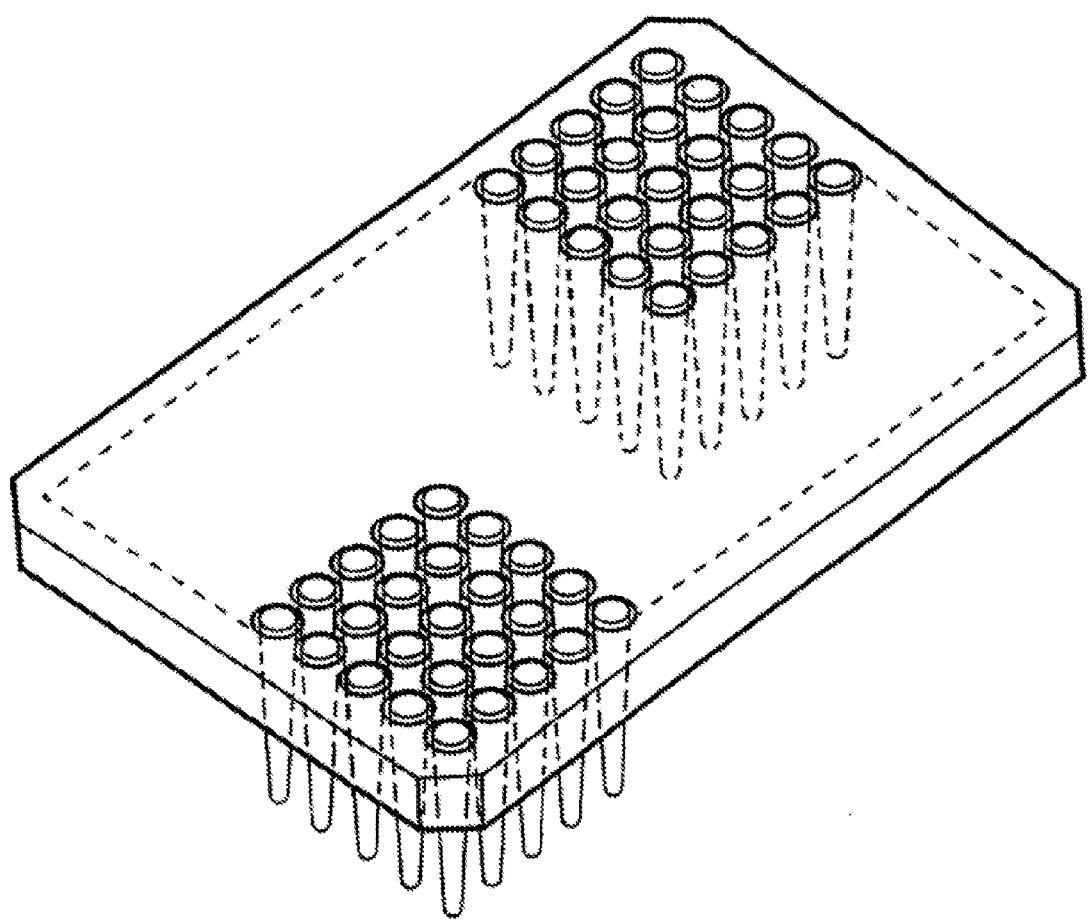
FIG. 7 shows a prior art reaction plate that could be used in the apparatus of the present invention.
Figure 8:
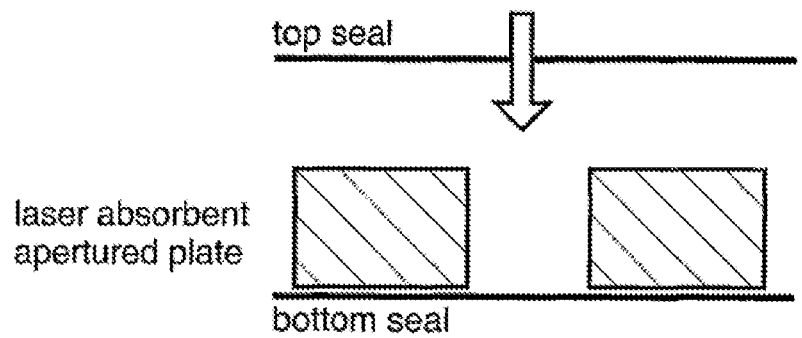
FIG. 8 shows a partial cross section through an apertured plate having cylindrical wells.
Figure 9:
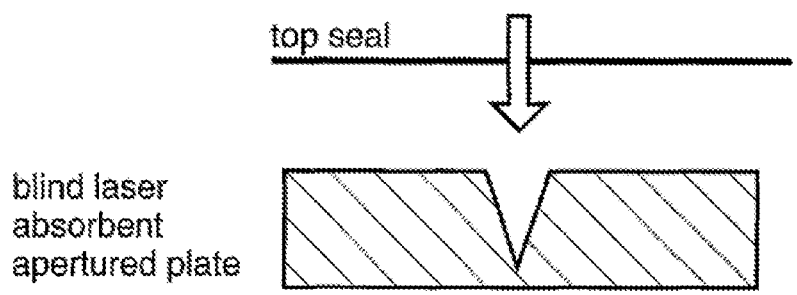
FIG. 9 shows a partial cross section through an apertured plate having conical wells.
Figure 10:
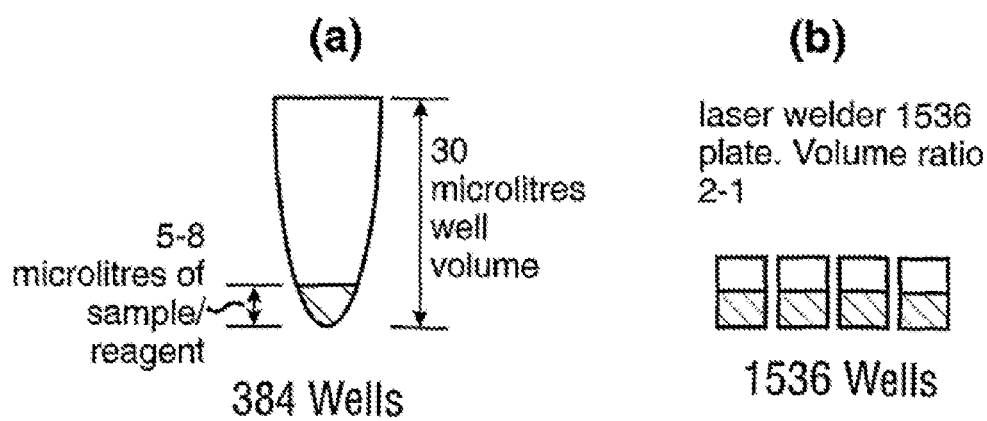
FIG. 10 shows a comparison between respective well volume to sample ratios for a prior art well and a laser welded reaction plate well.

Referring now to FIGS. 1 and 2 there is shown two different reaction plates in accordance with the present invention.

The reaction plates comprise an apertured plate 12 of substantially rectangular shape having typical dimensions of approximately 85 by 125 mm, with a thickness of approximately 2 mm. Extending through the apertured plate 12 there are provided an array of apertures 14 forming containers or wells for the reaction plate 10. Each aperture 14 is cylindrical, having a diameter or approximately 1.8 mm. The array has a 32 by 48 arrangement. The apertures could instead be square or rectangular, for example. Some of the apertures are, however, shown to be omitted, or blanked, as explained below. They are replaced instead with injection moulding points. However, it should be possible to mould the apertured plate with a complete array of apertures, or form a complete array in a blank by drilling or other processing methods.

A bar code or means of unique identification (not shown) can be placed on apertured plate at any time during manufacture or use.

In FIG. 1, the omitted apertures 16 are darkened. In FIG. 2, they are shown as blank spaces.

A corner 18 of the reaction plate 10 is chamfered to provide an indexing means for the automated reaction plate processing apparatus of the present invention.

Referring now to FIGS. 3 and 4, a schematic representation of an alternative form of reaction plate is shown. Two apertures 14 are provided in the aperture plate 12. Extending into an edge of each aperture 14 there is provided a groove 20. Grooves (or channels) enable selected apertures 14 to be in fluid communication with each other. Having the apertures in fluid communication enable fluids (reagents, for example) to be transferred (arrow 21) into otherwise closed apertures.

In use, the groove will be closed, as well as the apertures 14. A film 22 is attached to the apertured plate 12 over the groove as shown by the arrow 24 in FIG. 4. The film 22 will usually be continuous (see FIGS. 5 and 6), extending over the entire apertured plate 12, closing both all the apertures 14 and any grooves 20.

The groove may have been moulded into the apertured plate 12, or it could have been cut into the apertured plate 12.

Referring now to FIG. 5, there is shown a schematic representation of a device for attaching a film 22 to an apertured plate 12. The device comprises a diode laser welding apparatus 26 having a laser generator unit 28 and a beam focusing means 30. Laser welding units are known in the art that would be suitable for such application, i.e. a Herfurth Laser Technology TL250 diode laser. These prior art welding units perform what is generically known as "transmission welding".

An apertured plate 12 and associated film 22 are arranged such that the film 22 covers the required apertures 14. In this example this is all the apertures 14. A laser 32 is then directed at the film 22 so as to point-weld the film 22 to the apertured plate 12 (at the point shown by the arrow 34 in FIG. 5). The film 22 and apertured plate 12, and the laser 32, are then moved relative to one other so as to enable the weld to be completed. Preferably the weld is effected over all sections of the film 22 that are superimposed over non-apertured portions of the apertured plate 12.

Figure 11:
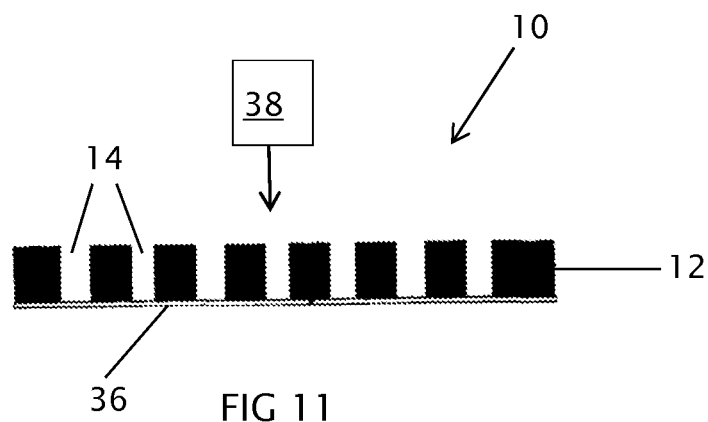
FIG. 11 shows the reaction plate of FIG. 6 being filled by a filling means.

By this method of manufacture, there is provided a flat multi~ well reaction plate with through holes which are covered (closed) at one end thereof with a thin film, for example polypropylene, the film being laser welded thereto to create a base layer. Sample or material 36 (see FIG. 6) can then be introduced into the wells via a filling means 38 (see FIG. 11) through the open ends of the wells and sealed therein by attaching a top sheet thereto to close the open ends of the wells. The sample or material 36 is usually a sample and one or more reagent.

A seal formed by the laser welding process will be most efficient when good contact is made between the two surfaces to be welded. Preferably, the film and plate to be welded will be held together by application of pressure using laser non-absorbent materials, allowing laser welding to occur through the materials. Said material is preferably glass, Perspex (RTM) or most preferably a combination of silicone rubber and/or glass. It may alternatively be air pressure applied from above or vacuum pressure from below the plate.

The above described apparatus provides reaction plates having a high number density array of wells or containers each being small and having sealed therein individually treatable samples, thereby enabling PCR's with low volumes of sample liquids, for example, and with a large number of tests thereon. Further, laser welding is extremely accurate and heat is locally contained on the target object. Therefore, very thin films are weldable. Since a film is used, the heating of the sample can be accurately controlled when the heating is by means of transferring heat through the film. By way of example, the film 22 will generally have a thickness of 1 micrometres, or less. Preferably the film is 62 micrometers thick.

In a preferred embodiment, the diode laser is used to melt adhesive of adhesive backed films for connecting those films onto the apertured plate 12. The diode laser can also be used to re-melt the adhesive for removing the film to access material 36 (see FIG. 6) that had been sealed within the wells. This provides recyclability. However, the adhesive would need to be chosen such that it does not contaminate the material 36 within the well.

Although specific multi-well arrays are illustrated herein (1440 wells and 1152 wells in FIGS. 1 and 2 respectively), the present invention may be used to create liquid storage vessels of existing formats, for example with 1, 2, 4, 6, 8, 12, 24, 48, 96 or 384 wells, or even with 1536, 3456 or 6144 wells or any other such variants as might be desired. Arrays can be provided having other arrangements of blanked apertures as well.

An example of a one aperture array would be for processing of DNA/Oligonucleotide micro arrays on glass or plastic slides, a thin 1mm thick frame could be welded to the slide, a film would then be welded to the frame covering whole surface. Fluids input and output ports could be provided allowing fluid to be passed over the slide or sample in a controlled manner.

Figure 12:
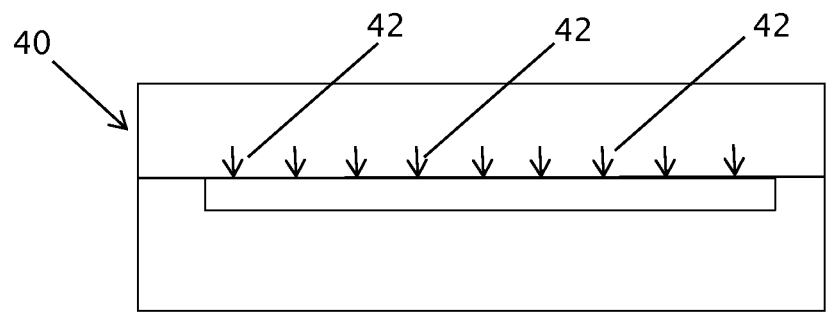
FIG. 12 shows and injection molding unit for injection molding a reaction plate.

The preferred apertured plates are injection moulded, such as with an injection molding unit 40 (see FIG. 12) complete with the apertures. Due to the fine nature of the preferred aperture size, however, it may be necessary to use multiple injection points 42 for the injection moulding step. By using multiple injection points 42, there is no difficulty in ensuring the injected material, i.e. plastic, flows fully within the mould. In the plate of FIG. 2, the maximum injection flow distance within the mould can be as low as 2 or 3mm (each blanked aperture corresponds to an injection moulding point). By placing these regularly about the apertured plate, a uniform injection can be achieved. However, it should be possible to injection mould the apertured plate with fewer injection mould points. For the apertured plate of FIG. 1, 96 injection mould points were used. In the apertured plate of FIG. 2 there were 384 injection mould points.

This method of manufacturing reaction plates 10, and the reaction plates themselves, have a number of uses. These includes:
1. Welding a clear, translucent polymer film to a plastics multi-well reaction plate creates a liquid tight seal. If the other end of the wells are also closed, this forms a liquid tight, or even fluid tight, containment. This containment may also be achieved by welding both a top and a base film to the ends of a cylindrical or square tube, or pipe, for example 2 dimensional multiple plate type arrays and 1 dimensional glass/plastic slide frame or strips of vessels can be created and formed into higher arrays.
2. In the manufacture of micro wells to carry out DNA amplification (polymerase chain reaction) to be carried out at low volumes (sub 4 microlitres).
3. In the manufacture of liquid tight seals over micro channels to transfer or add liquids from each well, thus creating a "lab on a plate/chip".
4. The laser welding of pre-coated, treated, polypropylene films (strepavidin, DNA's, oligonucleotides, colour dies etc) to apertured plates for creating microtitre format reaction plates with pre-coated internal surfaces.
5. The use of laser welded reaction plates for single and multiplexed fluorescent imagery, e.g. for genotyping applications and typically TaqMan® applications by Applied Biosystems.
6. The use of laser welded reaction plates for single and multiplexed fluorescent imagery, e.g. for genotyping applications and typically Fluorescence Resonance Energy Transfer (FRET) based assays.
7. For genotyping applications where detection of assay, positive signal SNP (single nucleotide polymorphic) specific target (single and multiplexed) are observed in the reaction plate from the top or the base or on reagent/sample removal via spectroscopy, mass spectroscopy, gel based sequencing (slab and capillary), radiation, fluorescence, chemi-luminescence, or hybridisation.
8. For the detection of DNA, proteins, antibodies, biological fluids, sera, mine by tags.
9. For the use in patient/population genotyping, environmental monitoring, military "NBC" (nuclear biological chemical) warfare testing, quality control using the novel plate format with pre set markers/probes in a "kit" form.
10. The bonding of a conductive material/film to a single or both planar surface that have "detection" (conduction/reaction) properties or facilitate the movement (i.e. Osmotic flow) or control of the internal reagents/fluids therein.
11. For the creation of dried down DNA or Oligonucleotide samples or probes for distribution.

A diode laser array unit could be used to increase the speed at which the weld is completed; instead of welding a point or a line, a strip can thereby be welded. The diode laser array may, for example, be a one dimensional diode laser array of varying configurations i.e. circular, square, rectangular or line. The diode laser can have a variable focus allowing various different sizes of welding "spots".

The laser or laser array unit may be mounted to a robotic platform for controlling it, such that it is possible to cover the plate with a sheet of polypropylene to create containment or containers, or to weld each individual well shut. This is achieved, for example, by moving the laser over the interstitial space between the well apertures, thus protecting the samples from exposure to the laser source.

By using diode lasers, for example in the array format, it has now become possible to weld, for example, a polypropylene film to a solid laser absorbent substrate to create rigid, thermally efficient and stable micronize or reaction plate capable of carrying out an increased number of PCR's/reactions in one go, and at significantly reduced volumes, than previously achievable using the conventional moulded multi-well reaction plates or the disadvantageous adhesively sealed reaction plate, whereas conventional thermal welding of a film resulted in optically poor results due to the glue backing reducing optical efficiency.

The one dimensional diode laser array welds accurately, quickly and effectively at the point of contact of the two materials, i.e. the laser absorbent substrate and the non laser absorbent (i.e. appropriately transparent film/sheet).

DNA and common reagents are not very absorbent of "IR" (infrared) energy and thus are not susceptible to heating damage at time of weld. Also the laser is defocused below the weld layer substantially reducing any laser energy.

The present invention has been described above purely by way of example. It should be noted that modification in detail may be made within the scope of the invention.

The invention claimed is:
1. A method of forming seals around a plurality of wells of a microtitre reaction plate, the wells being defined by a plurality of apertures in a planar surface of the reaction plate through which each well receives a reagent or sample that is subject to one or more reactions while confined and sealed within the reaction plate, each well having a volume of 200 microliters or less, the method comprising the step of attaching a plastics film to the planar surface of the reaction plate by forming seals around the apertures in the planar surface of the reaction plate for sealing the reagent or sample with the wells, using near-infrared diode laser welding to form each well seal, the plate being less than 4 mm thick and having at least 1152 wells per plate.

2. The method of claim 1, wherein the film covers at least one of the apertures, extending over the planar surface of the apertured reaction plate.

3. The method of claim 1, wherein at least one of the apertures extends from a first planar surface of the apertured reaction plate to a second, opposed planar surface.

4. The method of claim 3, wherein a second film is welded to the second surface.

5. The method of claim 4, wherein both films are transmission welded to the apertured reaction plate.

6. The method of claim 1, wherein channels or grooves are provided in the apertured reaction plate.

7. The method of claim 1, wherein the film is optically clear with minimal cross talk.

8. The method of claim 1, wherein the film has a thickness of between 1 and 500 micrometers.

9. The method of claim 1, wherein the apertured reaction plate is substantially rigid and opaque, and made of a plastics material.

10. The method of claim 1, wherein the apertured reaction plate is near infrared absorbent.

11. The method of claim 10, wherein the apertured reaction plate is black.

12. The method of claim 1, wherein the apertured reaction plate is non near-infrared absorbent.

13. The method of claim 1, wherein the film is near-infrared absorbent.

14. The method of claim 1, wherein, at least one of a reagent and sample are retainable within at least one of the apertures by the film or films.

15. The method of claim 1, wherein the film is readily pierceable.

16. The method of claim 1, wherein the film is coated with an affinity reagent.

17. The method of claim 16, wherein the affinity reagent is streptavidin.

18. The method of claim 1, wherein the film is coated with a chemical used in a reaction for which the reaction plate is to be used.

19. A method of claim 1, wherein the apertured reaction plate is substantially rigid and opaque and made of a plastics material.

20. The method of claim 1, wherein the plate has at least 1440 wells per plate.

21. The method of claim 1, wherein the plate has at least 1536 wells per plate.

* * * * *